United States Patent [19]

Jacobson

[11] 3,780,226

[45] Dec. 18, 1973

[54] TELEPHONE ANSWERING APPARATUS

[76] Inventor: Sava W. Jacobson, 4915 Tyrone Ave., Sherman Oaks, Calif. 91403

[22] Filed: Nov. 3, 1971

[21] Appl. No.: 195,400

[52] U.S. Cl. .................................................. 179/6 R

[51] Int. Cl. .............................................. H04m 1/64

[58] Field of Search ................. 179/6 R, 6 AC, 6 C, 179/6 E, 100.2 B, 100.2 RE, 100.1 A, 100.2 Z, 100.2 MD; 242/199–201, 206, 180, 55.19 R, 55.19 A; 274/4 H, 4 D, 11 D; 35/35 C, 8 A

[56] References Cited

UNITED STATES PATENTS

| | | | |
|---|---|---|---|
| 3,586,779 | 6/1971 | Chernack | 179/6 AC |
| 3,445,600 | 5/1969 | Todd | 179/6 R |
| 2,147,820 | 2/1939 | Milde | 179/6 R |
| 2,519,597 | 8/1950 | Owens | 179/100.1 A |
| 3,376,390 | 4/1968 | Hashimoto | 179/6 AC |
| 3,310,629 | 3/1967 | Yamamoto | 179/6 R |
| 3,592,968 | 7/1971 | Osawa | 179/6 R |
| 3,590,160 | 6/1971 | Meri | 179/6 R |
| 3,640,479 | 2/1972 | Hata | 242/55.19 A |
| 3,343,280 | 9/1967 | Tolnai | 35/35 C |
| 3,527,893 | 9/1970 | Honobe | 179/6 AC |

*Primary Examiner*—Raymond F. Cardillo, Jr.
*Attorney*—Flam & Flam

[57] ABSTRACT

A telephone answering apparatus uses an announcement tape loop driven continously throughout an answering cycle by the same mechanism which drives a tape cassette for recording incoming messages. Upon occurrence of a ringing signal, the drive mechanism is energized, the telephone line is loaded inductively and the announcement is provided via an amplifier to the line. When an electrically conductive segment on the tape loop reaches a first set of contacts, a flip-flop is set to disable the amplifier and unsaturate a record head which then records the unamplified incoming message on the cassette tape. The answering cycle terminates when the tape loop conductive segment reaches another set of contacts. Provision is made to record a new announcement using the telephone as a microphone.

30 Claims, 6 Drawing Figures

TELEPHONE ANSWERING APPARATUS

BACKGROUND OF THE INVENTION

1. Field of the invention

The present invention relates to a telephone answering apparatus wherein no mechanical shifting occurs between transmission of a prerecorded announcement and recording of the caller's message.

2. Description of the prior art

In recent years, automatic telephone answering devices have gained widespread acceptance in business establishments. Thus a salesman who must be away from his office can prerecord an announcement asking each caller to leave a message which is stored by the device for playback when the salesman returns. No call goes unanswered.

In the past, complexity and high cost have severely limited home use of such devices. Development of a simple, low cost telephone answering apparatus would pave the way for acceptance as a new household appliance.

Various implementations have been suggested. One approach is to store multiple announcements on alternate sections of a single recording tape. The intervening blank tape sections are used to record incoming messages. The outgoing and incoming message sections are separated by metallic patches on the tape which are sensed by electronic circuitry to change the mode of operation from announcement playback to incoming message record. This approach, while mechanically straightforward, requires the outgoing message to be recorded many times on the tape, thus making it difficult to change the announcement.

Several prior art telephone answering devices utilize twin tracks on the same tape, one containing the prerecorded announcement and the other for storing incoming messages. Again, the outgoing message must be recorded many times on the tape. The absence of speech on the line may terminate the answering cycle, or detection of conductive foil at the beginning of each announcement section may end the recording of an incoming message.

An alternative approach is shown in the U.S. Pat. No. 3,376,390 to Hashimoto. In this telephone answering device the outgoing announcement is prerecorded on an endless tape loop which is driven by a capstan and yoke mounted pinch roller mechanically engaged in response to ringing of the telephone. Incoming messages are recorded on a separate message tape which does not move while the announcement tape is being driven. When the outgoing message has been completed, a solenoid shifts the yoke mounted pinch roller away from the announcement tape and moves a second pinch roller on the same yoke into driving relationship with the message tape. Separate timing circuitry establishes either a preset duration for the incoming message recording cycle, or recording may continue so long as speech is present on the line.

Use of a separate announcement tape requires only a single outgoing message to be prerecorded, but switching of the drive system between incoming and outgoing message tapes is mechanically complex. An object of the present invention is to provide a telephone answering device using separate announcement and incoming message recording tapes, but requiring no mechanical operation to transfer from the announcement transmit mode to the incoming message record mode. These and other features provide a call answering system of mechanical simplicity and low cost.

SUMMARY OF THE INVENTION

The foregoing objective is achieved by providing a telephone answering apparatus wherein a single announcement is prerecorded on an endless tape loop and a rim drive cassette tape recorder is used to store incoming messages. The tape loop drive pulley engages the rim driven friction disc associated with the cassette take up reel to enable a single motor to drive both the tape loop and cassette tape continuously throughout the answering cycle.

Upon occurrence of a telephone ringing signal, the drive mechanism is energized, the telephone line is loaded inductively, and the outgoing message is played back via an amplifier to the telephone line. When an electrically conductive segment on the announcement tape loop reaches a first set of contacts, a flip-flop is set to disable the amplifier and unsaturate a play-record (P/R) head associated with the cassette tape. The message received from the telephone line then is recorded without amplification on the cassette tape. When the conductive segment reaches another set of contacts, the drive mechanism is turned off to terminate the answering cycle.

Provision is made for recording a new announcement on the tape loop using the telephone instrument as a microphone. In this mode, closure of the first set of contacts connects the amplifier in feedback arrangement to produce a signal tone recorded on the tape loop which later informs the caller to begin his message. When the cassette tape is rewound or played back to recover the recorded incoming messages, a simple lever arrangement moves the announcement tape loop drive wheel out of engagement with the cassette friction disc. The same amplifier is used to play back stored messages.

Complexity and cost of the apparatus are minimized by utilizing many components for more than one function.

BRIEF DESCRIPTION OF THE DRAWINGS

A detailed description of the invention will be made with reference to the accompanying drawings wherein like numerals designate elements in the several figures. These drawings, unless described as a diagrammatic or unless otherwise indicated, are to scale.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
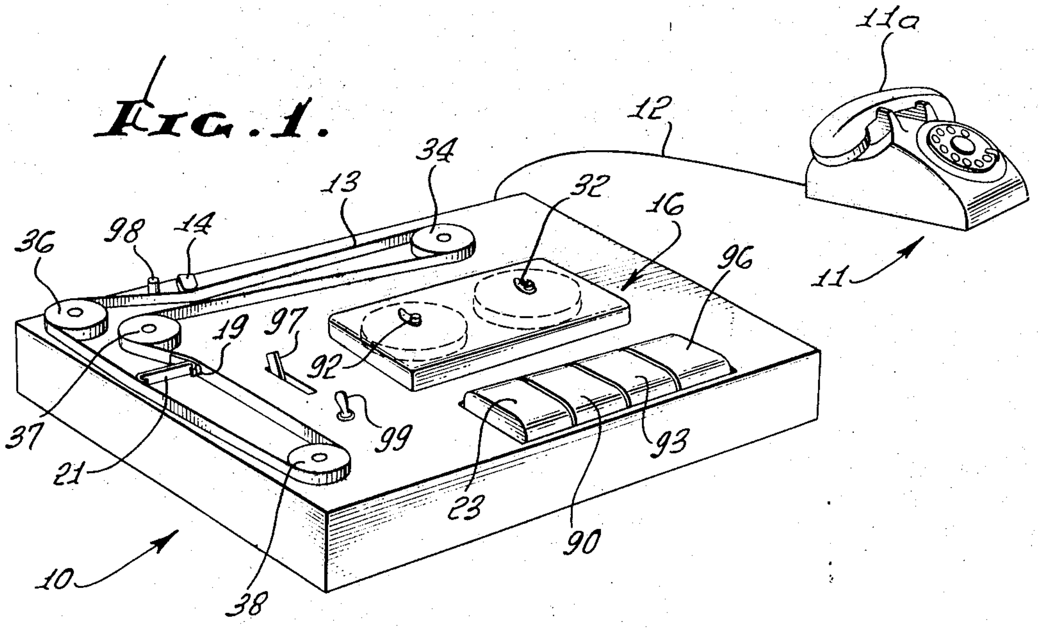
FIG. 1 is a perspective view of a telephone answering apparatus in accordance with the present invention.

Referring now to FIG. 1, an apparatus 10 in accordance with the present invention functions to answer calls received by telephone 11. Occurrence of a ringing signal on the line 12 to the telephone 11 actuates the apparatus 10 and causing an announcement prerecorded on an endless tape loop 13 to be transmitted via a playback head 14 and an audio amplifier 15 (FIGS. 4 and 5) to the telephone line 12. Typically the announcement will request the caller at the sound of a tone to leave a message, which message is recorded on a conventional cassette tape 16 employed by the apparatus 10.

Figure 2:
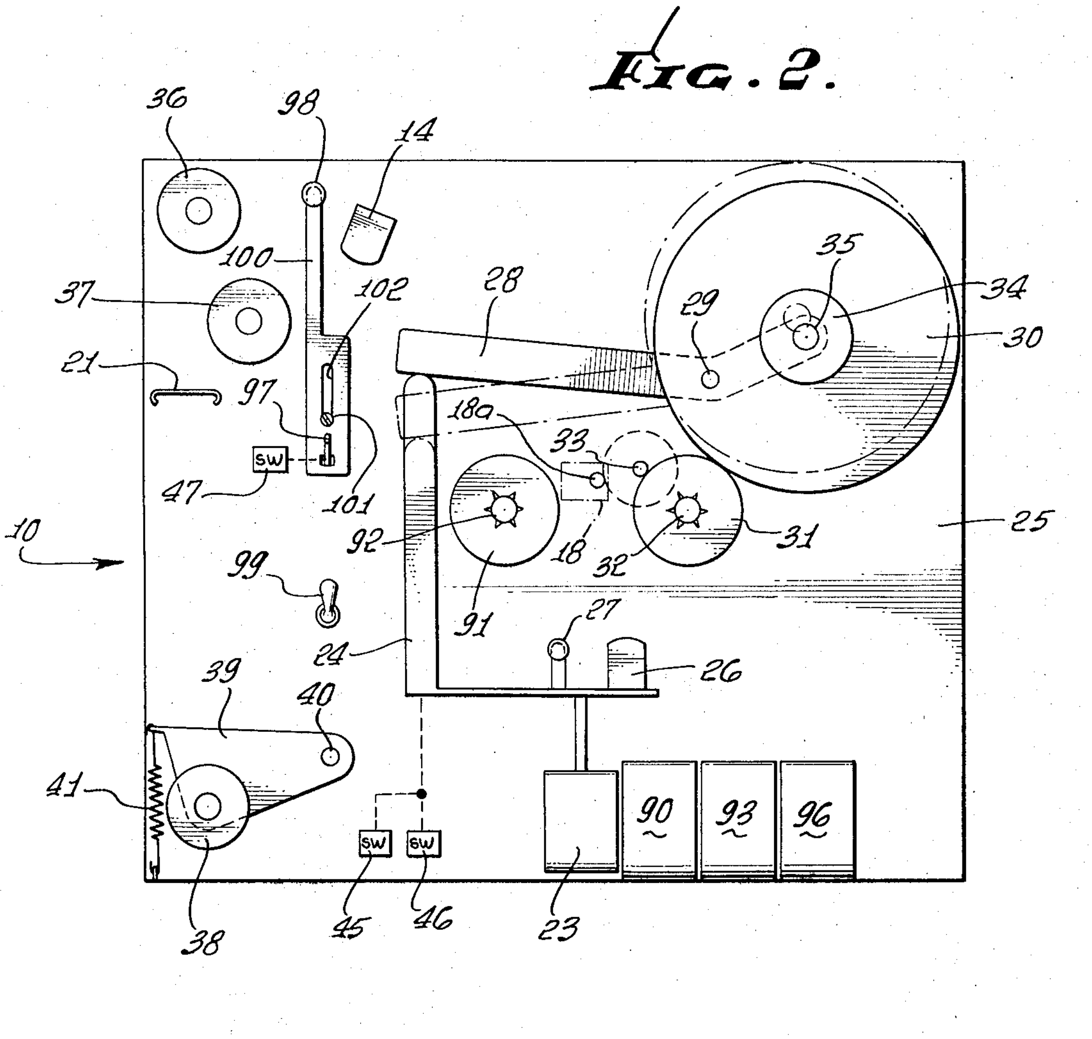
FIG. 2 is a top view of the telephone answering apparatus showing the mechanism for driving the announcement tape loop and the incoming message cassette tape.
Figure 3:
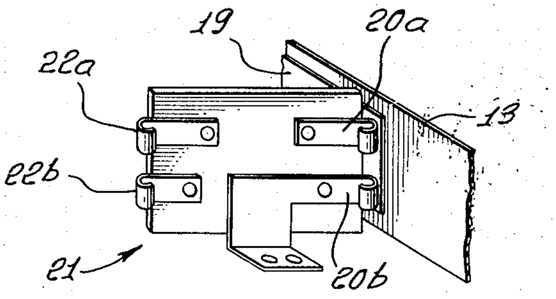
FIG. 3 is a perspective view of an electrical contact arrangement used in conjunction with an electrically conductive segment on the announcement tape loop.
Figure 4:
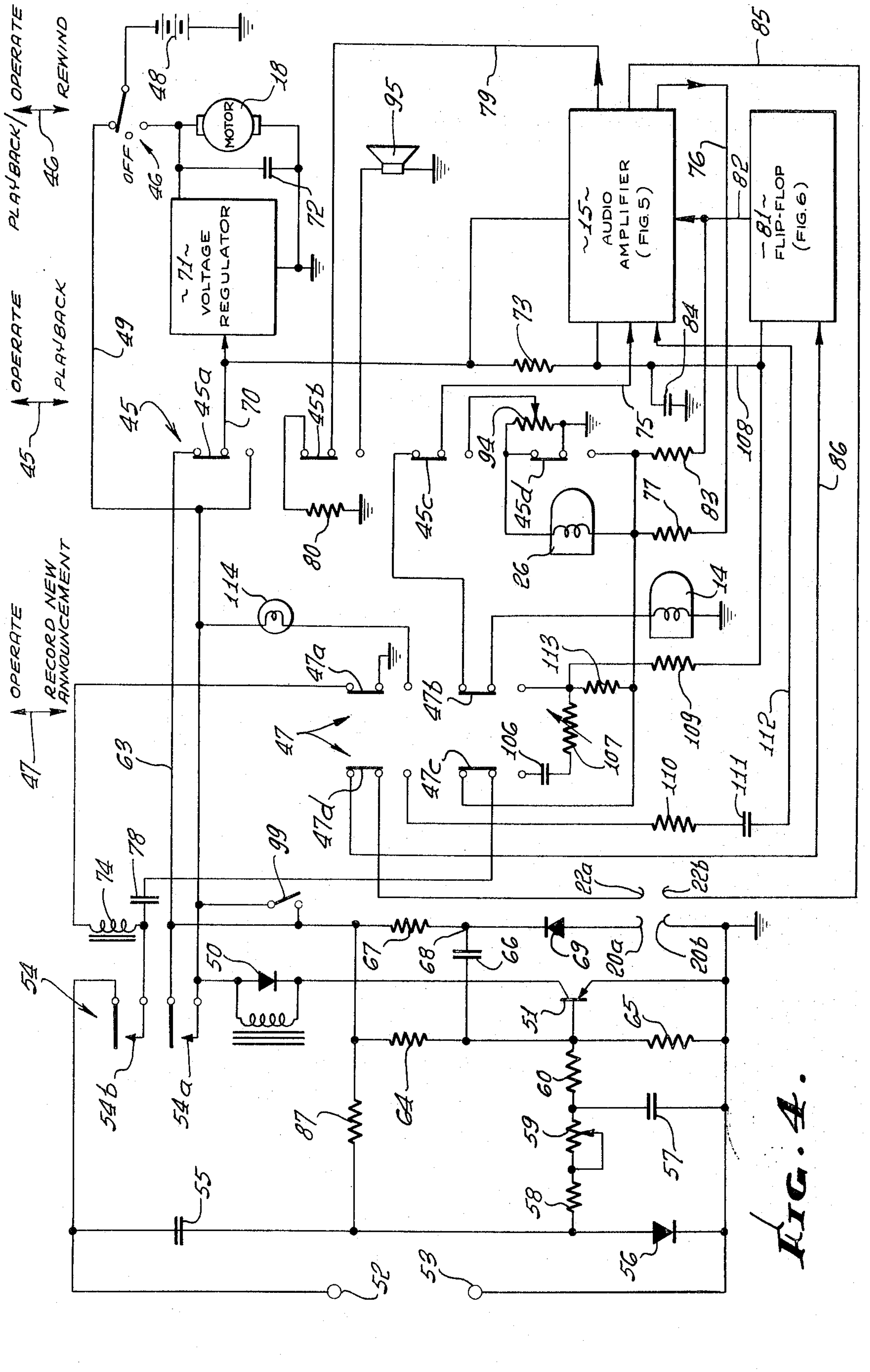
FIG. 4 is an electrical schematic diagram of a preferred embodiment of the invention telephone answering apparatus.

Both the announcement tape loop 13 and the incoming message recording tape 16 are driven continuously throughout the answering cycle by a single motor 18 (FIGS. 2 and 4). At the beginning of the answering cycle, a conductive metal segment 19 on the tape loop 13 is situated adjacent a first set of electrical contacts **20*a*, 20*b* mounted on a contact assembly 21 shown in detail in FIG. 3. As the outgoing message is sent to the caller, the tape loop 13 moves in a clockwise direction as viewed in FIG. 1 until the conductive segment 19 reaches and electrically shorts a second set of contacts 22*a*, 22*b* also mounted on the assembly 21. This causes the apparatus 10 to switch from the announcement transmit mode to the incoming message record mode; as discussed below, no mechanical shifting or change in the manner or tape drive occurs at this time. The tape loop 13 continues to rotate in the same direction while the incoming message is recorded on the cassette tape 16. Eventually, the conductive segment 19 again reaches and shorts the contacts 20*a*, 20*b*. Closure of these contacts 20*a*, 20*b* turns off the motor 18 and disconnects power from the apparatus 10** to terminate the answering cycle.

To condition the apparatus 10 to answer incoming calls, an "OPERATE" pushbutton 23 is depressed. This causes an L-shaped arm 24 to move rearwardly with respect to the chassis 25 of the apparatus 10. A record head 26 and an erase head 27 thereby are carried into operative engagement with the incoming message recording tape in the cassette 16. Such rearward movement of the arm 24 also causes a lever 28 to rotate about a pivotal mounting 29 to bring a tape loop drive wheel 30 into rim engagement with the friction disc 31 associated with the takeup reel spindle 32 of the cassette 16. Except in the rewind mode, the friction disc 31 is rim driven by an idler 33 impelled by the shaft 18a of the motor 18.

During the call answering cycle, the single motor 18 drives the cassette tape 16 via the friction disc 31 and the takeup reel spindle 32. The motor 18 also drives the tape loop 13 via the friction disc 31, the drive wheel 30 and a tape loop drive pulley 34 coaxially attached to the wheel 30 for rotation about a shaft 35 extending from the lever 28. The tape loop 13 is guided by a pair of idler pulleys 36, 37 mounted on the chassis 25. Tension is maintained on the tape loop 13 by means of an idler pulley 38 attached to a bracket 39 which is pivotally mounted by a shaft 40 to the chassis 25. A bias spring 41 extending between the bracket 39 and the chassis 25 urges the pulley 38 in a direction which maintains relatively constant tension on the tape loop 13.

Rearward displacement of the L-shaped arm 24 also moves a four pole, two position switch 45 and a single pole, double throw switch 46 to the operate positions shown in FIG. 4. Another four pole, two position switch 47 also is in the operate position during the call answering cycle.

Referring now to FIG. 4, the apparatus 10 is powered by a battery 48 or other voltage source. During the answering cycle the battery 48 is connected via the switch 46, a line 49 and the coil of the relay 54 (shunted by a turn-off transient suppression diode 50) to the collector of a transistor 51. Prior to receipt of a call, the transistor 51 is non-conducting, so that no current is drawn from the battery 48.

The telephone line 12 is connected to the apparatus 10 via a pair of terminals 52, 53. Occurrence of a ringing signal on the telephone line 12 causes the transistor 51 to conduct, the resultant current through the diode 50 energizing a relay 54 which latches to provide power to the apparatus 10 throughout the answering cycle.

Latching of the relay 54 is accomplished in the following manner. The telephone ring signal present across the terminals 52, 53 is supplied via a capacitor 55 to a diode 56 which rectifies the signal. The resultant DC voltage charges a capacitor 57 at a rate determined by a pair of resistors 58, 59. The capacitor 57 is connected via a resistor 60 to the base of the transistor 51. Thus when the charge on the capacitor 57 is sufficiently great, the transistor 51 will conduct, energizing the relay 54. By adjusting the value of the resistor 59, the apparatus 10 can be set to respond to a call at the very beginning of the first ring or after the bell has rung for a short period of time. The latter adjustment is preferred, as it is disconcerting to a caller to have the telephone answered before he hears the ring tone.

As soon as the relay 54 is energized, a first set of relay contacts **54*a* close, to provide voltage from the battery 48 via a line 63 and a voltage divider comprising a pair of resistors 64, 65 to the base of the transistor 51. This base voltage biases the transistor 51 on, thereby latching the relay 54** in the energized state.

The relay 54 remains latched throughout the answering cycle. During this time, a capacitor 66 is charged via a resistor 67. At the end of the answering cycle, the tape loop conductive segment 19 reaches and electrically short circuits the contacts **20*a*, 20*b*. When this occurs, the junction 68 between the capacitor 66 and the resistor 67 is shorted to ground via a diode 69. Since the voltage across the capacitor 66 cannot change instantaneously, the voltage at the base of the transistor 51 is driven sufficiently positive so as to turn off the transistor 51 and open or unlatch the relay 54, thereby disconnecting power from the apparatus 10** and terminating the answering cycle.

Note that the relatively slow charging of the capacitor 66 prevents premature turnoff of the relay 54 while the conductive segment 19 still is shorting the contacts 20a, 20b at the beginning of the answering cycle. Preferably the charge stored in the capacitor 66 during this initial period is less than the forward potential barrier of the diode 69. Thus the diode 69 appears open circuited, insuring that the relay 54 will not turn off prematurely even though the segment 19 may intermittently open and close the contacts 20*a*, 20*b* at the beginning of the cycle.

When the relay 54 closes at the beginning of an answering cycle, voltage is supplied to the motor 18 via the line 63, a section 45*a* of the switch 45, a line 70 and a voltage regulator 71. A capacitor 72 shunts the motor 18. The voltage regulator 71 functions to insure constant motor 18 speed, and hence constant rates of tape movement, even though the battery 48 voltage may decrease with time. Closure of the relay 54 also provides voltage via the line 70, a resistor 73 and a filter capacitor 84 to other circuitry such as the audio amplifier 15.

A second set of contacts 54*b* of the relay 54 is used to connect an inductive load 74 across the telephone line 12 via the section 47*a* of the switch 47. The inductor 74 simulates the loading of an off-hook telephone receiver.

To transmit the prerecorded announcement, the playback head 14 associated with the tape loop 13 is connected via the switch sections 47*b* and 45*c* to the input line 75 of the audio amplifier 15. The amplified signal is coupled via an amplifier output line 76, a resistor 77, the switch contact 47*c* and a capacitor 78 to the telephone line 12. During the answering cycle, the speaker output line 79 from the amplifier 15 is loaded by a resistor 80 via a switch segment 45*b*.

During transmission of the prerecorded announcement, the play/record head 26 associated with the cassette tape 16 is maintained at least partially saturated by a voltage supplied from a flip-flop 81 via a line 82 and a resistor 83. This insures that the outgoing message will either not be recorded on the incoming message tape, or will be recorded at an amplitude level much lower than with that of the incoming messages.

Switchover from the announcement transmit mode to the incoming message record mode occurs when the tape loop conductive segment 19 electrically short circuits the contacts 22*a*, 22*b*. When this occurs, a DC voltage provided on a line 85 is supplied via the shorted contacts 22*a*, 22*b* and a switch section 47*d* to the toggle input 86 of the flip-flop 81. The flip-flop 81 thereupon changes state, terminating the amplifier 15 first stage supply voltage on the line 82. As a consequence, the audio amplifier 15 is disabled and the record head 26 is unsaturated.

The message received from the telephone line 12 is supplied via the terminal 52, the closed relay contacts 54*b*, the capacitor 78 and the switch section 47*c* directly to the play/record head 26. No amplification is employed as the incoming message is recorded by the head 26 on the cassette tape 16. The audio amplifier 15 is disabled, therefore no noise from this source is introduced via the line 76 and the resistor 77 to the P/R head 26. This permits the recording of very low level incoming message signals free from interfering noise originating e.g., at the motor 18 and amplified by the amplifier 15. After the initial ringing signal, the diode 56 is heavily biased off by a voltage supplied via a resistor 87 to prevent the diode 56 from distorting the incoming message.

Preliminary to recovery of recorded incoming messages, the cassette tape 16 is rewound by depressing the "REWIND" pushbutton 90 (FIGS. 1 and 2). This action causes the L-shaped arm 24 to retract, thereby sufficiently pivoting the lever 28 to disengage the tape loop drive wheel 30 from the friction disc 31. At the same time, the motor shaft 18*a* is disengaged from the outer rim of the idler 33 and coupled instead to a friction disc 91 associated with the spindle 92 receiving the supply reel of the tape cassette 16. Depression of the pushbutton 90 also transfers the switch 46 (FIG. 4) to the rewind position, thereby directly connecting the battery 48 to the motor 18. The voltage regulator 71 is not used during the rewind operation; direct battery voltage provides the maximum rewind speed.

Upon the completion of the rewind operation, the "PLAYBACK" pushbutton 93 is depressed. This functions to move the P/R head 26 but not the erase head 27 into contact with the cassette tape 16, and to position the idler 33 against the takeup reel friction disc 31 so as to drive the tape 16 forward. However, the drive wheel 30 remains disengaged from the friction disc 31 so that the tape loop 13 remains stationary during playback of the incoming messages. Thus the tape loop 13 will be located at the correct answering cycle starting position when the "OPERATE" pushbutton 23 next is depressed.

Depression of the pushbutton 93 also moves the switch 45 to the playback position; the switches 46 and 47 remain in the operate position. This switch orientation connects the battery 48 via the line 49 and the switch section 45*a* directly to the line 70. Thus, the motor 18 is energized via the voltage regulator 71, and power is supplied to the audio amplifier 15 via the line 70 and the resistor 73.

During playback, the P/R head 26 is connected via a potentiometer 94 and the switch section 45c to the input 75 of the audio amplifier 15. The amplifier output line 79 is connected via the switch section 45*b* to a speaker 95 which thus reproduces the recorded incoming messages. Subsequently, the tape cassette can be removed from the apparatus 10 by means of a conventional mechanism (not shown) associated with an "EJECT" pushbutton 96.

To record a new announcement on the tape loop 13, a control arm 97 (FIGS. 1 and 2) is moved toward the front of the chassis 25 to position an erase magnet 98 against the tape loop 13 and to set the switch 47 in the record announcement position. The "OPERATE" pushbutton 23 is depressed to engage the tape loop drive wheel 30, and a momentary pushbutton switch 99 is closed to latch the relay 54 and energize the apparatus 10. The new announcement is spoken into the telephone handset 11a which functions as a microphone in this mode of operation, after the dial tone is cleared. When the tape loop conductive segment 19 reaches the set of contacts 22*a*, 22*b* a tone is recorded on the tape loop 13 indicating that the announcement is over; this tone subsequently indicates to a caller that he should begin his message.

The control arm 97 is connected to the erase magnet 98 by a linkage 100 located atop the chassis 25 and guided by a pin 101 which rides in a longitudinal slot 102 in the linkage 100. During the call answering cycle, the control arm 97 and linkage 100 are positioned as shown in FIG. 2 with the erase magnet 98 spaced sufficiently far from the tape loop 13 so as not to erase the prerecorded announcement. When recording a new announcement, the control arm 97 and linkage 100 position the erase magnet 98 so as to erase from the tape loop 13 the old outgoing message.

Closure of the pushbutton switch 99 (FIG. 4) supplies a gate voltage via the resistor 64 to bias on the transistor 51. In the same manner as described above, conduction of the transistor 51 causes the relay 54 to latch on. Power thus is supplied to the apparatus 10 while a new announcement is recorded.

With the switch 47 in the record announcement position, the telephone instrument 11 is operatively connected to the play/record head 14. The signal path includes the terminal 52, the closed relay contacts 54*b*, the capacitor 78, the switch section 47*c*, a capacitor 106, an adjustable resistor 107, and the switch section 47*b*. No amplification is used. Bias voltage is supplied to the record head 14 from the capacitor 84 via a line 108 and a resistor 109.

When the tape loop conductive segment 19 reaches the contacts 22*a*, 22*b* a signal tone is recorded on the tape loop 13. This is accomplished by completing a feedback circuit for the audio amplifier 15 through the short circuited contacts 22*a*, 22*b*. The feedback path includes the amplifier output line 85, the switch section 47*d*, a resistor 110, a capacitor 111, and an input 112 to the amplifier 15. The tone produced by the resultant oscillation of the amplifier 15 is supplied to the record head 14 via the amplifier output line 76, the resistor 77, another resistor 113 and the switch section 47*b*. The oscillation frequency primarily is established by the resistor 110 and the capacitor 111, while the resistor 113 sets the level at which the tone is recorded on the tape loop 13.

When used for recording an announcement, the telephone 11 is not inductively loaded. This insures that an off-hook condition will not continue after the handset 11*a* is placed back on the telephone 11 after recording the new announcement. If the inductive load 74 were left in circuit, the off-hook condition would continue and the telephone company off-hook recorded message or beeps might be heard in the telephone 11. The switch section 47*a* is used to disconnect the inductive load 74 in the record announcement position and also functions to turn on a light bulb 114 indicating that the apparatus 10 is in the announcement record mode.

Figure 5:
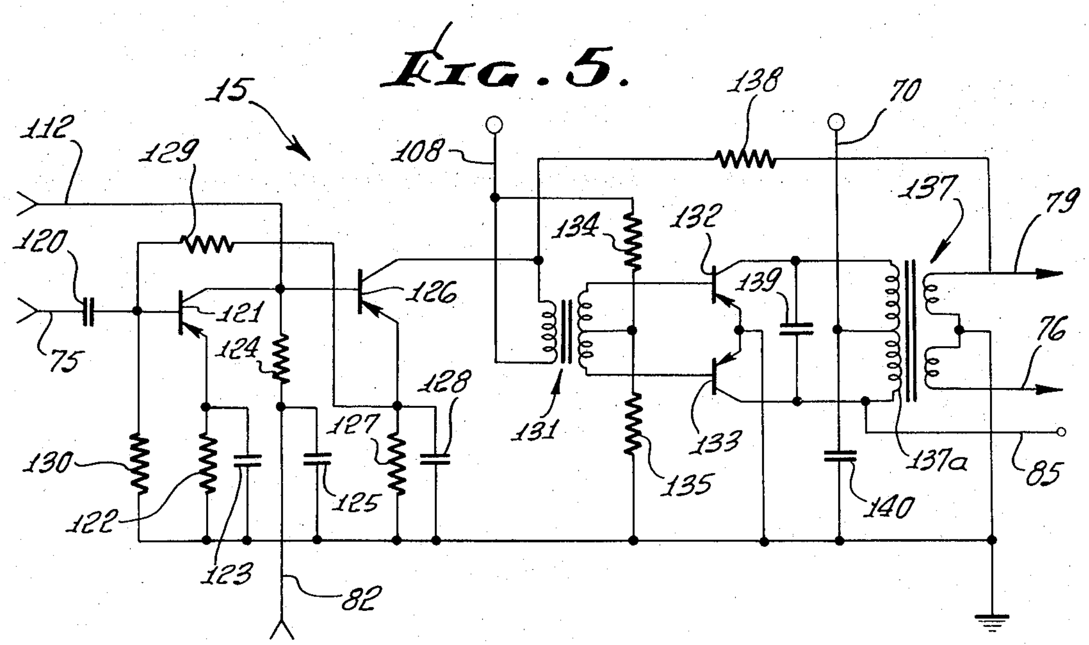
FIGS. 5 and 6 respectively are electrical schematic diagrams of the audio amplifier and flip-flop components of the telephone answering apparatus of FIG. 4.

In FIG. 5 there is shown a preferred embodiment of the audio amplifier 15. The output of the P/R head 14 is supplied via the line 75 and a capacitor 120 to a first transistor 121 the emitter of which is connected to ground via a resistor 122 and a capacitor 123. Collector voltage is supplied from the line 82 to the transistor 121 via a load resistor 124 and a bypass capacitor 125 only when the flip-flop 81 is conditioned to enable the amplifier 15. The amplifier 15 is disabled during recording of an incoming message; no voltage then is supplied on the line 82 from the flip-flop 81.

The output of the transistor 121 is amplified by another transistor 126 the emitter of which is connected to ground via a resistor 127 and a capacitor 128. Bias for the transistor 121 is provided from the transistor 126 emitter via a resistor 129; the base of the transistor 121 also is connected to ground via a resistor 130.

The transistor 126 output is supplied via a center tapped secondary transformer 131 to a pair of push-pull connected transistors 132, 133. Bias voltage is supplied to the transformer 131 center tap via a divider comprising a pair of resistors 134, 135.

The transistors 132, 133 are connected across the center tapped primary 137*a* of an output transformer 137 having a pair of secondary windings connected respectively to the output lines 76 and 79. Feedback is provided by a resistor 138 connected between the output line 79 and the transformer 131 primary. An anti-parasitic capacitor 139 shunts the primary 137*a*, and a bypass capacitor 140 is connected from the center tap of the primary 137*a* to ground. A feedback output is obtained from one end of the primary 137*a* via the line 85. During operation as an oscillator, this output is fed back as described above via the resistor 110, the capacitor 111 and the line 112 directly to the base of the transistor 126. As noted earlier, the line 85 also supplies the DC voltage which triggers the flip-flop 81 when the contacts 22*a*, 22*b* are closed during mode switchover.

Figure 6:
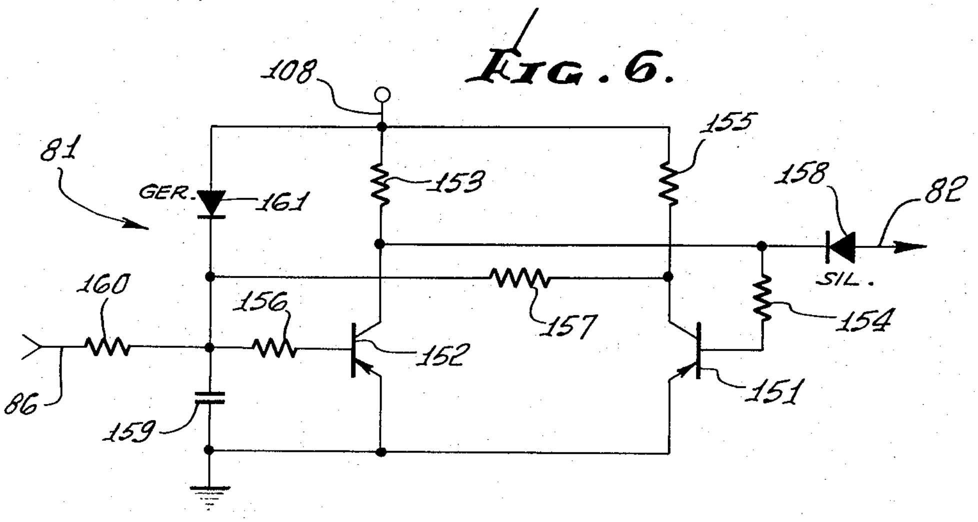

In FIG. 6 there is shown a preferred embodiment of the flip-flop 81. The flip-flop 81 is configured so that when voltage is applied to the apparatus 10 at the beginning of an answering cycle a first transistor 151 will be on, and another transistor 152 will be off. This is accomplished by immediately supplying a bias voltage to the base of the transistor 151 via a pair of resistors 153, 154. Bias to the transistor 152 is delayed by the cooperation of the resistors 155, 156, 157 and a capacitor 159.

With the transistor 151 on, current flows through the collector resistor 155, and the base of the transistor 152 is clamped to ground via the resistors 156, 157 and the conducting transistor 151. In this state, a voltage is supplied via a diode 158 and the line 82 to enable the amplifier 15 and to saturate the incoming message record head 26.

As noted earlier, a flip-flop trigger signal is provided on the line 86 when the tape loop conductive segment 19 shorts the contacts 22*a*, 22*b*. This trigger signal charges a capacitor 159 via a resistor 160. The capacitor 159 is connected via the resistor 156 to the transistor 152 base. When the charge on the capacitor 156 is sufficiently great, the transistor 152 will go on and the transistor 151 will turn off, thereby switching the state of the flip-flop 81 in delayed response to occurrence of the trigger signal. It is during this delay that the tone recorded on the tape loop 13 is transmitted, informing the caller to begin his message.

The diode 158 insures that the voltage on the line 82 will be essentially zero when the collector voltage of the transistor 152 is at its saturation value, typically several tenths of a volt. As a result, no voltage will be present on the line 82; accordingly, the amplifier 15 will be disabled, and the record head 26 will be unsaturated to permit recording thereby of the incoming message. A diode 161 is provided to discharge the capacitor 159 quickly at the beginning of the answering cycle, to insure that the transistor 151 initially is turned on.

Thus there is disclosed an automatic telephone answering device capable of transmitting a prerecorded announcement to the caller and subsequently recording the caller's message. Minimal complexity and low cost is achieved by utilizing many components for dual functions. Among the items performing double duty are the following:

a. The tape loop 13 contains the announcement and is used for cycle timing.

b. The conductive segment 19 is used for mode switching and cycle termination.

c. Closure of the contacts 22*a*, 22*b* triggers the flip-flop 81 when answering calls and enables tone generation when recording an announcement.

d. The amplifier 15 amplifies the announcement when answering calls, amplifies the cassette recorded messages on playback, and functions as an oscillator to generate a tone after recording a new announcement.

e. The line 85 provides a DC signal for flip-flop triggering and provides AC feedback for tone generation.

f. The heads 14 and 26 each are utilized for recording and playback.

g. The single motor 18 and friction disc 31 drive both the tape loop 13 and the tape cassette 16.

h. The telephone 11 functions as a microphone.

i. The switch section **47*a* disconnects the load 74 and turns on the lamp 114** when recording a new announcement.

Intending to claim all novel, useful and unobvious features shown or described, the applicant claims:

1. Telephone answering apparatus comprising:

announcement means for transmitting an announcement prerecorded on a tape loop having a single coded segment, separate recorder means for recording incoming messages, common drive means for driving both said tape loop and said recorder means continuously throughout an answering cycle, first and second means for detecting said same coded segment at respective first and second locations substantially separated along the path of travel of said tape loop, means for electronically switching from the announcement transmit portion of said answering cycle to the incoming message record portion of said cycle in response to detection by said first means of said coded segment at the first location, and termination means for subsequently terminating the answering cycle in response to separate detection of said same coded segment at the second location by said second means.

2. Telephone answering apparatus according to claim 1 and adapted for direct wired connection to the line of the telephone being answered, further comprising:

an amplifier, a playback head operatively positioned to detect said prerecorded announcement from said tape loop, a record head for recording onto a tape of said separate recorder means, flip-flop switch means, a first state of said switch means enabling said amplifier to amplify the announcement detected by said playback head for transmission directly to said telephone line, said first state also biasing said record head sufficiently to attenuate recording thereby, and means for causing said flip-flop switch means to switch to a second state upon detection of said coded segment at said first location, said second state disabling said amplifier and enabling said record head, said record head then recording the unamplified audio signal incoming directly from said telephone line onto said tape of said separate recorder means, said termination means disconnecting power from answering device circuitry and from said drive means upon detection of said same coded segment at said second location.

3. Apparatus according to claim 1 including means for conditioning said apparatus to record said announcement, comprising:

means for positioning an erase magnet against said tape loop to erase the announcement previously recorded thereon, first switch means for connecting said telephone line to said playback head to enable recording thereby of a new announcement supplied via said telephone, and second switch means for energizing said drive means to drive said tape loop while said announcement is being recorded.

4. Apparatus according to claim 3 further comprising:

oscillator means for recording an audio tone on said tape loop in response to detection of said coded segment at a first location.

5. Apparatus according to claim 4 wherein said oscillator means comprises an amplifier connected to oscillate at an audio frequency, said amplifier being connected to amplify said prerecorded announcement for transmission to said telephone line when said apparatus is conditioned to answer calls.

6. Apparatus according to claim 1 further comprising:

answer initiation means for energizing said apparatus including said common drive means and for connecting a load across the line to said telephone in response to occurrence of a ringing signal on said line, thereby initiating said answering cycle, and wherein said termination means deenergizes said common drive means and disconnects said load in response to detection at said second location of said coded segment, thereby terminating said answering cycle.

7. Apparatus according to claim 6 wherein said coded segment is electrically conductive, wherein said apparatus is switched from transmit to record when a first set of contacts is shorted by said conductive segment, and wherein said termination means is operative when a second set of contacts is shorted by said conductive segment.

8. Apparatus according to claim 6 wherein said recorder means comprises an incoming message tape takeup reel spindle having a rim driven element and wherein said tape loop is driven by wheel means engaging said element when said apparatus is conditioned to answer calls.

9. Apparatus in accordance with claim 8 wherein said element comprises a friction disc, wherein said wheel means comprises a pulley engaging said tape loop and attached to a drive wheel mounted for peripheral contact with said friction disc, and wherein said drive means includes a motor positioned in driving relationship with said friction disc when said apparatus is conditioned to answer calls, said motor being energized by said answer initiation means to initiate said answering cycle without mechanical shifting of said drive means.

10. Apparatus according to claim 6 further comprising:

a playback head operatively positioned against said tape loop, an amplifier connected to amplify and transmit to the telephone line the announcement recovered from said tape loop by said playback head, and means for disabling said amplifier when said apparatus is switched from transmit to receive.

11. Apparatus according to claim 10 wherein said means for disabling comprises a bistable switch set to a first state enabling said amplifier when said apparatus is energized at initiation of said answering cycle and set to a second state disabling said amplifier upon detection at said second location of said coded segment.

12. Apparatus according to claim 11 wherein said recorder means comprises a record head operatively connected to said telephone line when said apparatus is conditioned to answer calls, said recording head being sufficiently biased so as to disable recording at least partially when said bistable switch is set to said first state to mute recording of said announcement, said recording head being enabled when said bistable switch is set to said second state to enable recording of an incoming message.

13. A telephone answering apparatus of the type utilizing a tape loop prerecorded with an announcement and having separate means for recording incoming messages on another tape, comprising:

a message tape takeup reel spindle element powered by a rim drive mechanism, said element comprising a friction disc rim driven by a motor shaft, and means for utilizing said rim drive mechanism to drive said tape loop continuously throughout the answering cycle of said apparatus, comprising:

a drive pulley for said tape loop, a wheel fixedly, coaxially attached to said pulley, and a lever supporting said drive pulley and wheel and adapted to move said wheel into peripheral, driving engagement with said friction disc when said apparatus is conditioned to answer calls.

14. Apparatus according to claim 13 wherein said tape loop includes a single electrically conductive segment and wherein said apparatus includes two sets of electrical contacts mounted adjacent said tape loop at respective first and second locations, shorting of said first set by said conductive segment causing said apparatus to switch from an announcement transmit mode to an incoming message record mode, shorting of said second set by said conductive segment causing said motor to be deenergized to terminate said answering cycle.

15. Apparatus according to claim 14 further comprising:

a first record head associated with said tape loop, an amplifier connected to amplify and transmit to said telephone line the announcement recovered from said tape loop by said first record head, and a flip-flop set to a first state enabling said amplifier at the beginning of said answering cycle and set to a second state in response to shorting of said second set of contacts to disable said amplifier in said incoming message record mode.

16. Apparatus according to claim 15 further comprising a second record head operatively connected to record on said other tape messages incoming from said telephone line, said second record head being enabled when said flip-flop is in said second state.

17. Apparatus according to claim 15 wherein said flip-flop is set to said second state a preselected time after said first set of contacts are shorted.

18. Apparatus according to claim 15 further including means for prerecording said announcement comprising:

a control arm and linkage for positioning an erase magnet against said tape loop to erase a previously recorded announcement therefrom, and circuit means for operatively connecting said first record head to record an announcement supplied from said telephone.

19. Apparatus according to claim 18 wherein during said announcement recording operation shorting of said first set of contacts causes said amplifier to function as an oscillator, the audio tone produced thereby being recorded on said tape loop.

20. A telephone answering apparatus comprising:

a tape recorder having a rim driven takeup reel spindle, a tape loop having an announcement recorded thereon and having a single electrically conductive segment, a means for driving said tape loop including a drive wheel in operative engagement with said spindle rim throughout the answering cycle of said apparatus, a playback head associated with said tape loop and connected via an amplifier to said telephone line during an announcement transmit portion of said answering cycle, a record head associated with said tape recorder and connected to said telephone line during an incoming message record portion of said answering cycle, and mode selection circuitry including bistable switch means set to one state to enable said amplifier and to attenuate recording by said record head before said conductive segment reaches a set of contacts at a first location, shorting of said contacts causing said bistable switch means to switch to a second state to enable said record head thereafter to record unamplified audio signals incoming from said telephone line, and to disable said amplifier to prevent rerecording by said tape recorder of noise picked up from the portion of said tape loop not containing an announcement.

21. Apparatus according to claim 20 wherein said mode selection circuitry includes a flip-flop preset to an amplifier enabling first state at initiation of said answering cycle, and set to a record head enabling second state in delayed response to closure by said conductive segment of a set of contacts at said first location, such delay in setting of said flip-flop allowing transmission to said telephone line of a tone recorded on said tape loop.

22. Apparatus according to claim 20 further comprising means for prerecording on said tape loop an announcement supplied by utilizing as a microphone the telephone answered by said apparatus.

23. Apparatus according to claim 22 wherein said prerecording means further comprises means for connecting said amplifier as an audio oscillator when a set of contacts at said first location is closed by said conductive segment, the resultant audio tone being recorded on said tape loop.

24. Apparatus according to claim 20 further comprising:

answer initiation circuitry for energizing said apparatus to start both said tape recorder and said tape loop when said telephone rings, and answer termination means for stopping said tape recorder and said tape loop and deenergizing said apparatus when said conductive segment reaches a second location.

25. Apparatus according to claim 24 wherein said answer initiation circuitry comprises:

a relay for controlling power to said apparatus and to the motor driving said recorder and said tape loop, transistor circuit means for latching on said relay in delayed response to occurrence of a ringing signal to said telephone, and wherein said termination means comprises another circuit for unlatching said relay in response to shorting by said conductive segment of a set of contacts situated at said second location.

26. Apparatus according to claim 25 wherein said other circuit includes means for preventing the unlatching of said relay while said second location contacts are shorted by said conductive segment at the beginning of said answering cycle.

27. In a telephone answering apparatus having tape means for storing an announcement and for recording incoming messages, the combination of:

a. an amplifier, b. means for connecting said amplifier to amplify said announcement for telephone transmission during an answering cycle of said apparatus, c. means for connecting said amplifier to amplify recorded incoming messages during a playback cycle of said apparatus.

d. means for prerecording on said tape means an announcement supplied utilizing as a microphone the telephone answered by said apparatus, during a prerecording cycle of said apparatus, and c. means, operative during said prerecording cycle, for connecting said amplifier to produce a tone recorded by said tape means subsequent to said announcement.

28. Apparatus according to claim 27 wherein said tape means includes a conductive segment and a set of contacts closed by said segment, wherein said amplifier is connected to produce said tone only when said set of contacts is closed during said prerecording cycle, and further comprising means operative during said answering cycle for disabling said amplifier in delayed response to closure of said set of contacts, such delay enabling telephone transmission of said recorded tone.

29. Apparatus according to claim 27 wherein said tape means includes a conductive segment contained on a tape loop, and a pair of contacts shorted by said segment, further comprising:

means for energizing said apparatus in response to occurrance of a telephone ringing signal to initiate said answering cycle, means for deenergizing said apparatus in response to shorting of said contacts to terminate said answering cycle, and means for preventing deenergization of said apparatus when said contacts are shorted at the beginning of said answering cycle.

30. In a telephone answering apparatus of the type which is directly connected to the telephone line and which includes a tape loop containing a prerecorded announcement for transmission to the telephone line during a first portion of the answering cycle, and a separate tape for recording incoming messages during a second portion of the answering cycle, both said tape loop and said separate tape being driven by a common motor continuously throughout the entire answering cycle, the improvement comprising:

a. a single electrically conductive segment on said tape loop and used to control both the transition from said first portion to said second portion of said answering cycle and the termination of said answering cycle, b. two sets of contacts situated at two respective locations substantially separated along the path of travel of said tape loop, said single conductive segment closing the first set of contacts at the cycle transition time, and subsequently closing the second set of contacts to terminate the answering cycle, c. bistable switch means set to a first state during said first portion of the answering cycle and switched to a second state upon closure of said first set of contacts by said single conductive segment, said switch means remaining in said second state during said second portion of said answering cycle, d. an amplifier connected to amplify the announcement from said tape loop for transmission to said telephone line, said amplifier being enabled when said bistable switch means is in said first state, and being disabled when said bistable switch means is in said second state, e. A recording head for recording onto said separate tape, said recording head being connected directly to said telephone line to record unamplified audio signals received from said telephone line during said second portion of the answering cycle, said recording being attenuated when said bistable switch means is in said first state, and f. circuit means responsive to a ringing signal on said telephone line for connecting power to said amplifier and to said common motor upon detection of a ringing signal, and for disconnecting said power from said amplifier and from said motor upon closure of said second set of contacts by said single conductive segment.

* * * * *